United States Patent [19]
Hancock

[11] Patent Number: 5,867,021
[45] Date of Patent: Feb. 2, 1999

[54] METHOD AND APPARATUS FOR SENSING THE POSITION OF A FERROMAGNETIC OBJECT

[76] Inventor: Peter G. Hancock, 6705 Lesli Ct., Plano, Tex. 75023

[21] Appl. No.: 798,975

[22] Filed: Feb. 11, 1997

[51] Int. Cl.⁶ .................. G01B 7/30; G01B 7/14
[52] U.S. Cl. ................ 324/207.2; 324/207.12; 324/207.25; 327/511
[58] Field of Search ................ 324/207.2, 207.21, 324/207.25, 207.24, 207.12, 166, 173, 174, 225, 235, 251, 252; 338/32 H, 32 R; 327/510, 511

[56] References Cited

U.S. PATENT DOCUMENTS

| | | |
|---|---|---|
| 5,414,355 | 5/1995 | Davidson et al. . |
| 5,442,283 | 8/1995 | Vig et al. . |
| 5,497,084 | 3/1996 | Bicking . |
| 5,500,589 | 3/1996 | Sumcad . |

Primary Examiner—Walter E. Snow
Attorney, Agent, or Firm—William D. Lanyi; Roland W. Norris

[57] ABSTRACT

A magnetic sensor is operated by a method which provides a magnetic field extending through a preselected detection zone. A permanent magnet can be used to provide the magnetic field. The method disposes a magnetically sensitive component within the magnetic field and the magnetically sensitive component, such as a Hall effect element, provides a first signal that is responsive to a portion of the magnetic field imposed on the magnetically sensitive component. The sensor also determines a base value and measures a maximum magnitude of the first signal during a preselected period of time, such as the time required for a gear to rotate so that all of its ferromagnetic teeth pass through the detection zone. The sensor also determines a reference value as a function of the base value and the maximum magnitude. The sensor compares the first signal to the reference value and provides a second signal that is a function of the relative magnitudes of the first signal and the reference value, whereby the second signal is representative of the position of the ferromagnetic object relative to the detection zone.

20 Claims, 9 Drawing Sheets

METHOD AND APPARATUS FOR SENSING THE POSITION OF A FERROMAGNETIC OBJECT

BACKGROUND OF THE INVENTION

1. Field of the Invention

The present invention is generally related to a magnetic sensor and, more particularly, to a magnetic sensor that is able to set a comparative threshold limit which is determined as a function of a peak value in order to optimize the operation of the sensor over a wide range of gaps between the sensing face of the sensor and the path of a ferromagnetic object.

2. Description of the Prior Art

Many different types of geartooth sensors are well known to those skilled in the art. U.S. Pat. No. 5,442,283, which issued to Vig et al on Aug. 15, 1995, discloses a Hall voltage slope-activated sensor circuit that includes a Hall element that is preferably followed by a Hall voltage amplifier and a pole end of a magnet which is preferably fixed adjacent to the Hall element. The amplifier output is connected directly to one of a pair of differential inputs of a Schmitt trigger circuit and is also connected, via a single or a dual polarity track and hold circuit, to the other of the differential Schmitt inputs. The dual polarity track and hold circuit causes the voltage across a capacitor to track positive and negative Hall voltage slopes and to hold the positive going peaks and negative going peaks of the Hall voltage presented to the other Schmitt input so that when the difference voltage between the Hall voltage and the held voltage of the capacitor exceeds a positive or negative threshold of the Schmitt circuit, the Schmitt circuit output changes binary state indicating the approaching edge or the receding edge of a ferrous geartooth. The dual polarity track and hold circuit is made up of two complimentary plus and minus peak detector circuits, each including a bipolar transistor having an emitter connected to the voltage holding capacitor, an operational amplifier with an output connected to the base of the transistor, the amplifier having a negative input connected to the transistor emitter and a positive input serving as the input of the Hall voltage tracking and holding circuit.

U.S. Pat. No. 5,500,589, which issued to Sumcad on Mar. 19, 1996, describes a method for calibrating a sensor by moving a magnet while monitoring an output signal from a magnetically sensitive component. The sensor is provided with a carrier that has a cavity shaped to receive a magnet in sliding association therein. Ribs are provided to guide the movement of the magnet into the cavity and a deformable rib is used to hold the magnet at a precise position determined by an active calibration process. A magnetically sensitive component is rigidly attached to a substrate and the substrate is rigidly attached to the carrier in which the cavity is formed. Electrically conductive leads are molded into the carrier and extend through the carrier to positions where they can be electrically connected to circuit runs on the substrate. A flexible wall can also be deformed in the carrier to deflect in response to the insertion of a magnet into the cavity. This provides additional holding capability that retains the magnet in position when an external force is removed.

U.S. Pat. No. 5,497,084, which issued to Bicking on Mar. 5, 1996, discloses a geartooth sensor with a means for selecting a threshold magnitude as a function of the average and minimum values of a signal of magnet field strength. The geartooth sensor is provided with a circuit which determines a threshold magnitude as a function of the minimum value of a first output signal from a magnetically sensitive component and an average output signal from a magnetically sensitive component. Circuitry is provided to determine the average signal. The minimum signal is then subtracted from the average signal and the resulting signal is doubled before being scaled by a predetermined fraction and then compared to the original output signal from the magnetically sensitive component. This circuit therefore determines a threshold signal as a function of both the minimum signal value and the average signal value and, in addition, enables the resulting signal to be scaled to a predetermined percentage of this difference for the purpose of selecting a threshold value that is most particularly suitable for a given application.

U.S. Pat. No. 5,414,355, which issued to Davidson et al on May 9, 1995, describes a magnet carrier disposed within a outer housing. A magnetic sensor is provided with a housing in which a carrier is inserted. The carrier is particularly shaped to retain a permanent magnet in a particular position relative to a plurality of electrical conductors and a substrate on which a magnetically sensitive component is attached. The carrier and its associated components are inserted into a housing which can be deformed to permanently retain the carrier within a cavity of the housing. All of the components of the sensor are designed to be easily assembled along a common axis to facilitate automatic assembly and manufacture of the sensor. The magnetically sensitive component can be a Hall effect element that is associated with other electrical components which are also attached to a substrate that is disposed proximate to a front end of the carrier.

The skilled artisan is familiar with the general operation of most magnetic sensors which typically comprises steps of measuring an output, from a magnetically sensitive component, such as a Hall effect element or a magnetoresistive device, and comparing that voltage to a predetermined threshold value. The threshold value can, in certain applications, be a constant magnitude. However, changing conditions can significantly affect the signal from the magnetically sensitive component and, generally, the accuracy of the sensor can be improved by calculating the threshold magnitude as a function of the changing signals from the magnetically sensitive component. For example, U.S. Pat. No. 5,497,084 measures the minimum magnitude of the signal from a Hall element and the average magnitude of the signal from the Hall element and uses these two variable signals to determine an appropriate threshold level. The Hall signal is then continuously compared to the threshold signal to determine the presence or absence of ferromagnetic teeth passing through a detection zone of the sensor. U.S. Pat. No. 5,442,283, in a different approach to this general problem, uses the peak values of the Hall signal as a temporary reference value and then changes the binary output signal from the sensor when the Hall signal decreases by a preselected amount relative to the stored peak value. U.S. Pat. No. 5,414,355 and U.S. Pat. No. 5,500,589 are typical of the type of structure used in magnetic sensors. These four patents mentioned above are expressly incorporated by reference in this description.

SUMMARY OF THE INVENTION

As will be described in greater detail below, the present invention measures the peak magnitude of a Hall effect signal as a series of ferromagnetic objects pass through its detection zone. In most applications of the sensor, the ferromagnetic objects are teeth of a gear and the teeth attached to the gear will repeatedly pass through the detection zone of the sensor in sequence as the gear rotates. If one of the teeth provides a higher Hall signal than the others, its signal is be used as the peak magnitude. In addition, the present invention uses a base value for purposes of its calculation of a threshold magnitude. The base value can be a preselected voltage level chosen and determined by calibration during the manufacturing process. The base value can be coincident with an expected minimum value of the Hall signal when in use, but this is not a requirement. When the peak magnitude is actively determined during the operation of the sensor, the difference between the base value and the maximum magnitude of the signal is measured. Since the base value is generally constant in most embodiments of the present invention, the difference between the base value and the maximum magnitude will vary as a function of the change in the maximum magnitude. This difference between the base value and the measured maximum magnitude is multiplied by a preselected percentage and then added to the base value. In this way, the reference value is determined dynamically as the sensor is used in conjunction with a rotating gear. This reference value can then be used as a threshold with which the changing signal from a magnetically sensitive component is compared. This comparison will, in turn, provide a method for switching the output signal from the sensor in a binary fashion to indicate the presence or absence of a tooth within the detection zone.

A method provided by the present invention for sensing the position of a ferromagnetic object comprises the steps of providing a magnetic field which has an affective range that extends through a preselected detection zone. In most applications, a permanent magnet can be used to provide the magnetic field and the detection zone is a region proximate to a pole face of the magnet.

Another step of the invention is disposing a magnetically sensitive component within the magnetic field. The magnetically sensitive component provides a first signal which is responsive to a portion of the magnetic field imposed on the magnetically sensitive component. For example, if the magnetically sensitive component is a Hall effect element, the portion of the magnetic field imposed perpendicularly on the sensing plane of the component will provide a signal that is output by the Hall element. The magnetically sensitive component can be placed between a pole face of the permanent magnet and the detection zone, but it should be understood that alternative positions of the magnetically sensitive component can also serve to perform the necessary functions of the present invention.

The next step of the invention is the determining of a base value. This, in most embodiments of the invention, is predetermined during a calibration procedure and is generally similar in magnitude to an expected minimum value of the magnetically sensitive component. However, it should clearly be understood that the base value need not be equivalent to an expected minimum value in all applications. The base value serves as a constant magnitude to which the changing peak magnitudes can be compared.

The next step of the invention is the measuring of a maximum magnitude, or peak magnitude, of the first signal from the magnetically sensitive component during a preselected period of time. As the sensor is used in operation, the preselected period of time would typically be a complete revolution of the gear. This continued measuring of the maximum magnitude would be refreshed as the gear rotates. However, it should clearly be understood that on start up of an automobile engine, the circuit of the present invention would continually determine the maximum magnitude that it experiences. Until the true maximum magnitude occurs, preliminary peak magnitudes will be used by the present invention to determine the threshold magnitude.

The invention further comprises a step of determining a reference value, or threshold magnitude, as a function of the base value and the maximum magnitude. This is done by adding the base value to a preselected percentage of the difference between the base value and the maximum magnitude. As an example, if the base value is two volts and the maximum magnitude is five volts, the difference between the preset base value and the dynamically determined maximum magnitude would be three volts. If a percentage of seventy percent is used, 2.1 volts would then be added to the base value of 2 volts and a threshold, or reference value, of 4.1 volts would be calculated. This reference value would then be compared to the dynamically changing output signal from the magnetically sensitive component to determine the presence of teeth or slots passing through the detection zone.

The present invention further comprises the step of comparing the first signal to the reference value, as described above. It also comprises a step of providing a second signal which is a function of the relative magnitudes of the first signal and the reference value. This second signal is typically a binary output signal whose logic state represents the presence or absence of a tooth in the detection zone.

As described above, the magnetic field can be provided by a permanent magnet and the detection zone can be proximate to a magnetic pole face of the permanent magnet. In addition, the magnetically sensitive component can be disposed between the permanent magnet and the detection zone. The magnetically sensitive component can comprise a Hall effect element or, alternatively, other magnetically sensitive materials. The ferromagnetic object can be a tooth of a gear and the preselected period of time described above can be generally equivalent to one revolution of the gear about an axis. The gear, in most applications, comprises a plurality of ferromagnetic teeth attached to a rotatable hub, wherein each of the teeth is sequentially passed through the detection zone as the gear rotates about its axis of rotation.

The method of the present invention can be performed by a sensor if the sensor comprises a means for providing the magnetic fields, a means for disposing the magnetically sensitive component within the magnetic field, a means for determining the base value, a means for measuring the maximum magnitude of the first signal during a preselected period of time, a means for determining a reference value as a function of the base value and the maximum value,.a means for comparing the first signal to the reference value and a means for providing a second signal which is a function of the relative magnitudes of the first signal and the reference value.

BRIEF DESCRIPTION OF THE DRAWINGS

The present invention will be more fully and completely understood from a reading of the Description of the Preferred Embodiment in conjunction with the drawings, in which.

DESCRIPTION OF THE PREFERRED EMBODIMENT

Throughout the Description of the Preferred Embodiment of the present invention, like components will be identified by like reference numerals.

Figure 1:
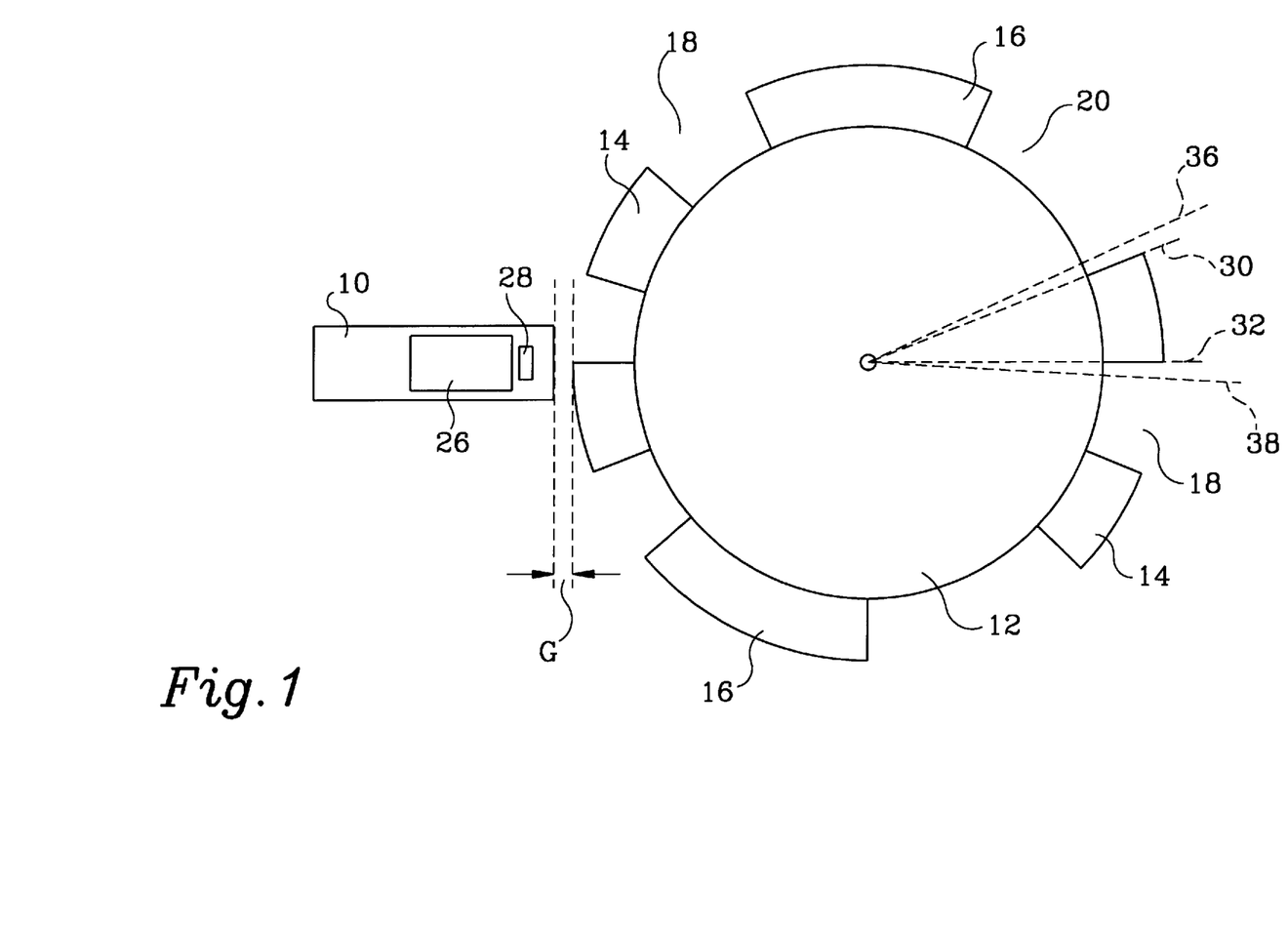
FIG. 1 illustrates an exemplary arrangement of a geartooth sensor and a gear.

FIG. 1 shows a typical arrangement of a geartooth sensor 10 disposed proximate to a gear 12 that has a plurality of ferromagnetic teeth, 14 and 16, attached to it. For purposes of this discussion, the teeth in FIG. 1 are illustrated as narrow teeth 14 and wider teeth 16. In addition, the gaps between the teeth can be narrow gaps 18 or wider gaps 20. The gear 12 rotates in a direction represented by arrow A about an axis 22 of rotation. Although the teeth as shown with generally planar outer surfaces, it should be understood that rounded teeth could also be sensed according to the principals of the present invention.

The geartooth sensor 10 typically comprises a permanent magnet 26 and a magnetically sensitive component 28. The magnetically sensitive component 28 is disposed within the magnetic field of the permanent magnet 26. In FIG. 1, the magnetically sensitive component 28 is disposed proximate to a pole face of the permanent magnet 26, but it should clearly be understood that alternative positions for the magnetically sensitive component 28 could have been chosen. The geartooth sensor 10 has a detection zone through which the teeth, 14 and 16, pass as the gear 12 rotates about its axis of rotation. Since the geartooth sensor 10 must be placed at a location to prevent contact between the teeth and its sensing face, a gap G exists between the ferromagnetic teeth and the sensing face of the geartooth sensor 10. This gap G can be nearly zero in some applications, but can vary from one application to another.

In the following description of the preferred embodiment of the present invention, certain terminology will be used. It is helpful to describe this terminology prior to the description of the invention in order to maximize the efficacy of the description. In FIG. 1, one of the teeth is illustrated with radial dashed lines, 30 and 32, coincident with its edges. These locations are referred to below as hard edges. Two other dashed lines, 36 and 38, represent dimensions that are approximately one degree larger than the hard edges of the tooth. It should be understood that the dimensions in FIG. 1 are not drawn to scale but, instead, are drawn to improve the clarity of the illustration. Lines 36 and 38 represent, between then, a dimension that is plus and minus one degree larger than the hard edges of the illustrated tooth.

It is beneficial if a geartooth sensor 10 can provide signals from the magnetically sensitive component 28 which represent the presence or absence of a tooth in the detection zone of the sensor. Furthermore, it is significantly beneficial if the geartooth sensor 10 can accurately define the passage of the hard edges of the teeth through the detection zone and relative to a preselected location.

Figure 2:
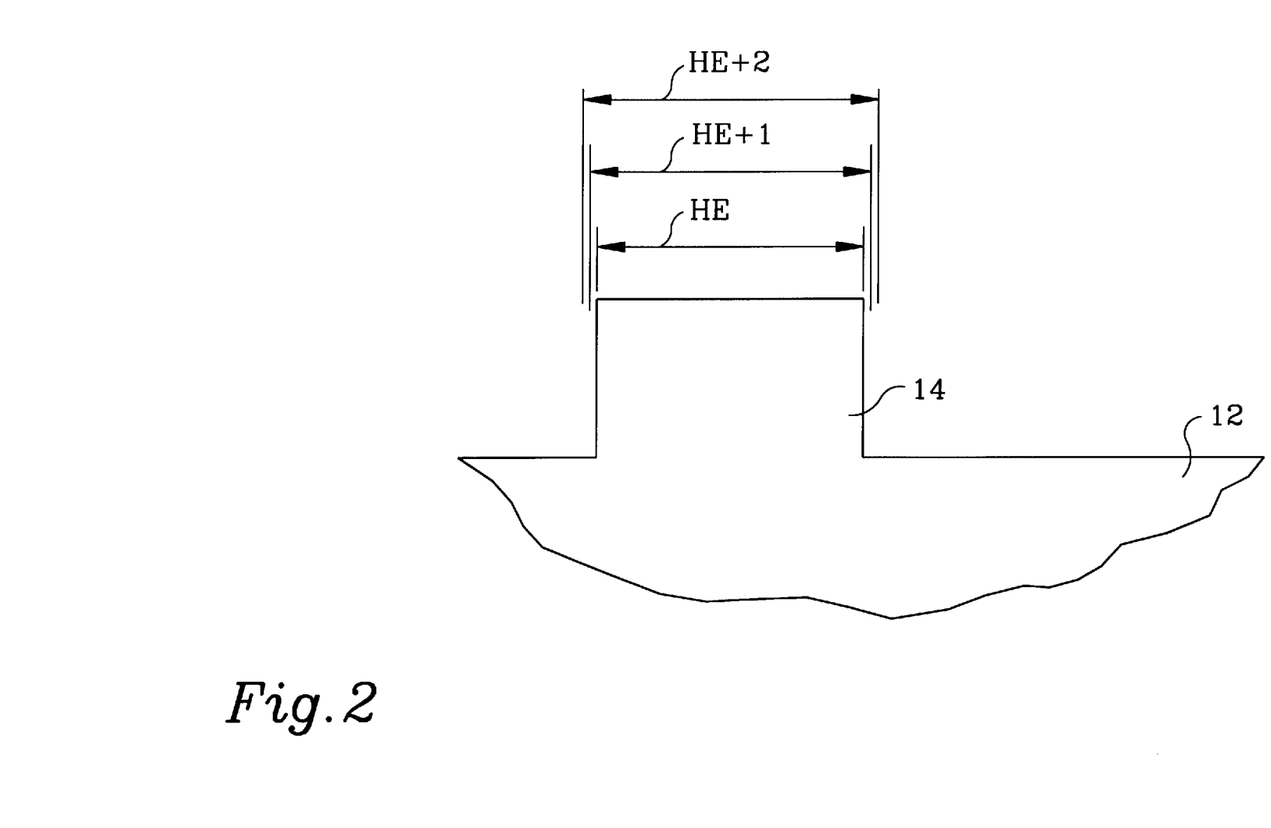
FIG. 2 is an expanded portion of one tooth of a gear.

FIG. 2 is an enlarged view of one tooth 14. In FIG. 2, the gear 12 and tooth 14 are extended as if they were a part of a linear target rather than a circular gear. This has been done for purposes of clarity and simplicity. The hard edge dimension HE of the tooth is identified in FIG. 14. In addition, the hard edge of the tooth plus one degree on each side is identified by the arrow labeled HE+1. Taking this terminology one step farther, the hard edge plus and minus 2 degrees is identified by the arrow labeled HE+2.

Figure 3:
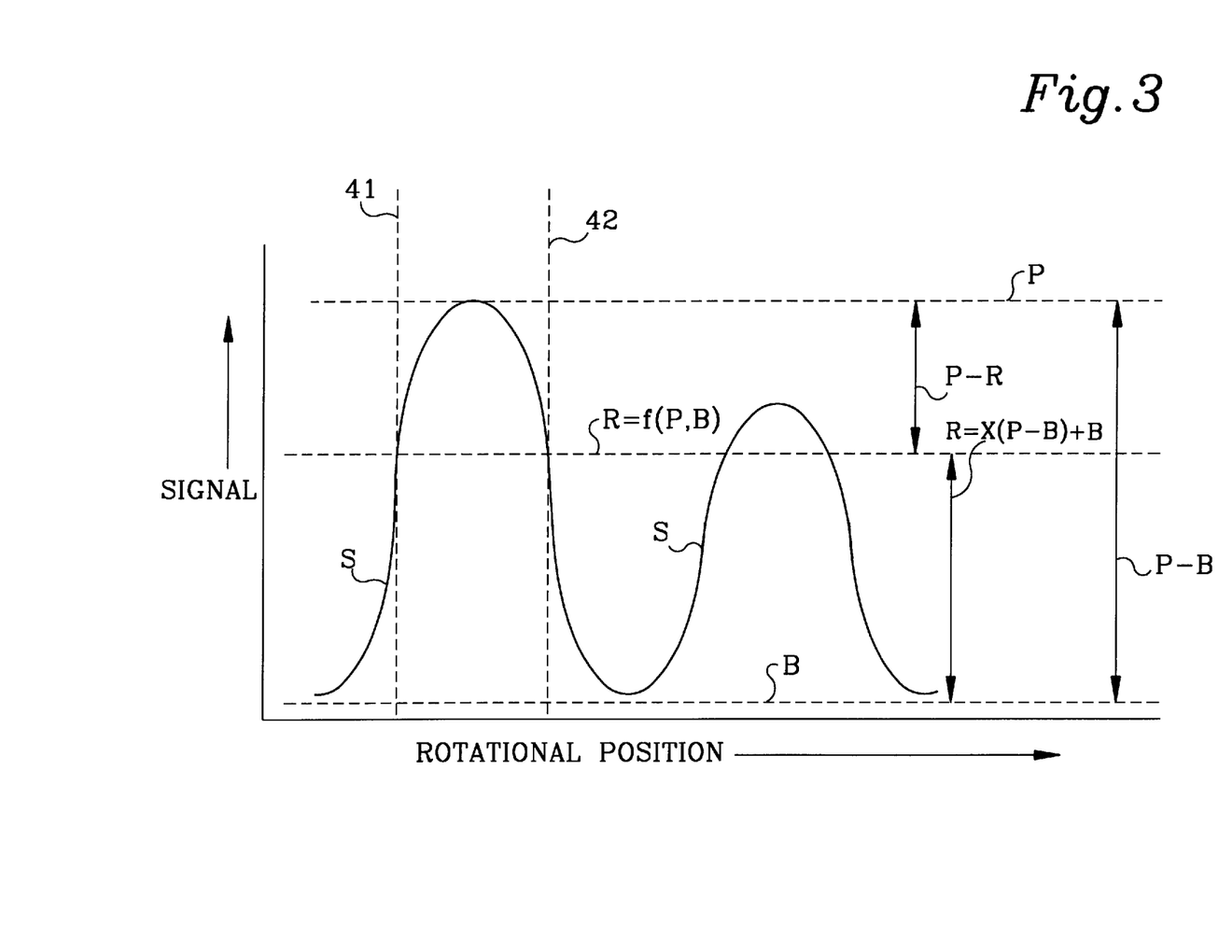
FIG. 3 is a hypothetical waveform used to describe certain basic characteristics of the present invention.

As the gear 12 rotates about its axis of rotation, the teeth pass through the detection zone and cause the output signal from the magnetically sensitive component 28 to vary in magnitude. FIG. 3 represents a highly schematic and simplified illustration of an output signal S from the magnetically sensitive component 28 shown as a function of the rotational position of a gear. It should be understood that FIG. 3 does not represent an actual empirical or simulated result but, instead, is an exemplary waveform provided to explain certain basic concepts relating to the present invention. Actual simulated results will be illustrated and described below.

In FIG. 3, the two tooth indications are of different magnitudes. They could also vary in width, but this is not shown in FIG. 3. Several dimensions are represented in FIG. 3 by dashed lines. Dashed line B represents a base value that is a constant voltage magnitude determined by a calibration processes during the manufacture of a geartooth sensor made in accordance with the present invention. It does not vary as a function of the rotation of the gearteeth or the varying magnitudes of signal S. Dashed line P represents the peak value of all of the tooth signals represented by the output from the magnetically sensitive component 28. As can be seen, the tooth signal to the left of FIG. 3 is higher in magnitude than the tooth signal to the right. Therefore, the maximum voltage magnitude of the signal is determined by the tooth that caused the signal to the left in FIG. 3. This dashed line P represents the peak output signal from the magnetically sensitive component 28. Dashed line R represents a reference value that, according to the present invention, is determined as a function of the maximum output signal magnitude, or peak P, and the base value B. The difference in magnitude between the peak magnitude P and the base value B is represented by an arrow that shows the magnitude as being equivalent to the difference between the peak P and the base value B. FIG. 3 also shows an arrow that represents the magnitude of the reference value R which is determined as a function of the peak and base values. More specifically, the reference value R is determined by adding the base value B to a percentage X of the difference between the peak magnitude P and the base value B.

FIG. 3 is intended to show the basic theory of the present invention in terms of a simplified waveform and does not actually represent an empirically derived or simulated waveform. Dashed lines 41 and 42 represent locations where the reference value R intersects the signal S during the voltage variations caused by the tooth illustrated to the left of FIG. 3. Similar vertical lines could be shown in conjunction with the second tooth signal to the right of FIG. 3, but these vertical lines are not necessary for this portion of the description and are not illustrated.

Figure 4:
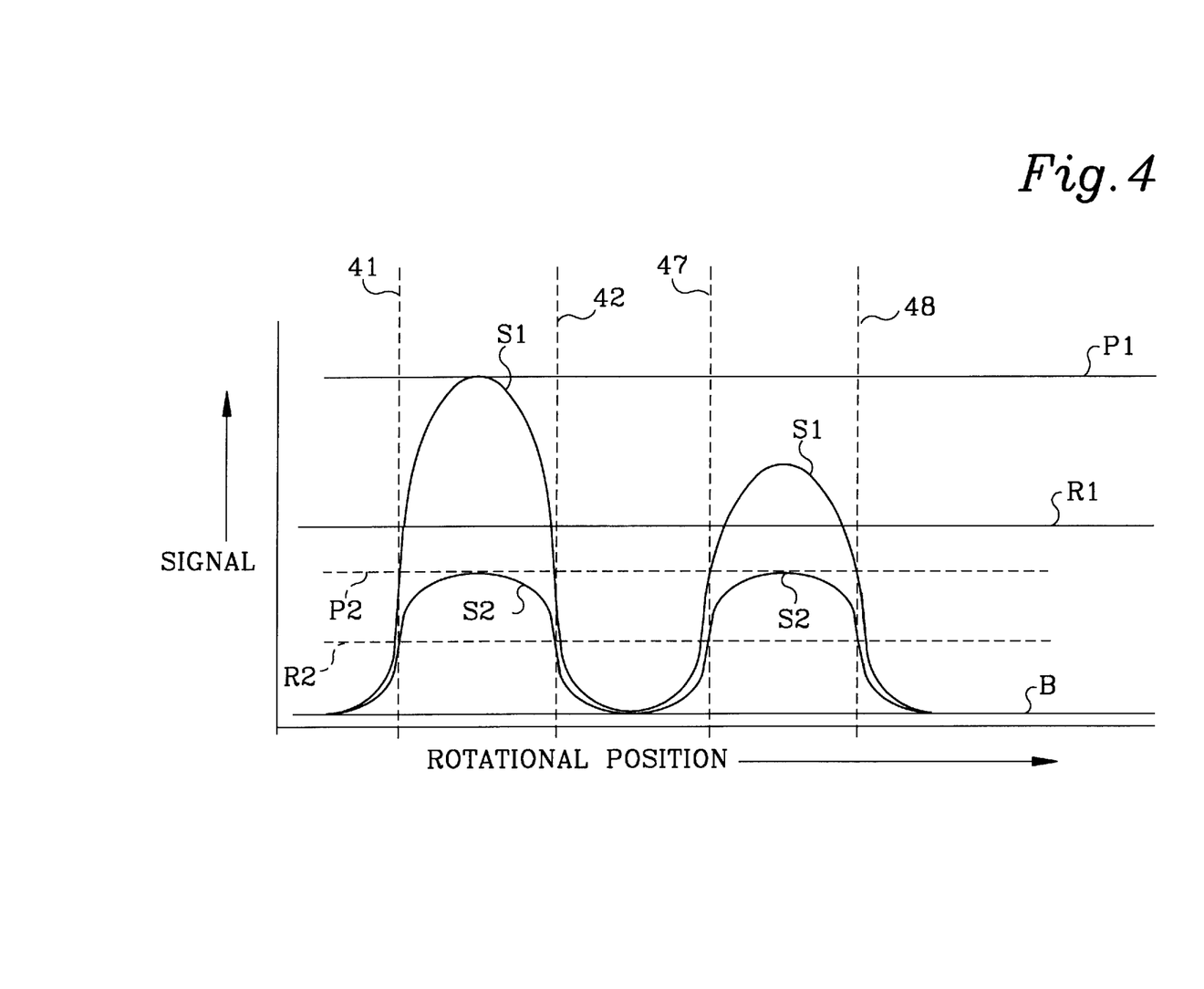
FIG. 4 shows two hypothetical waveforms used to compare certain characteristics of the waveforms.

FIG. 4 illustrates two waveforms, S1 and S2, that represent the resulting signals caused by a geartooth sensor disposed proximate to a rotating gear, but with two different gaps G which is described above in conjunction with FIG. 1. Waveform S1 results from a smaller gap G than waveform S2. However, it should clearly be understood that the location of a geartooth sensor relative to a rotating gear is sometimes difficult to set accurately. As a result, the gap G can vary from one application to another and this variation will cause a change in the magnitude of the signal provided by the magnetically sensitive component 28. This variation is schematically represented by the exemplary waveforms, S1 and S2, in FIG. 4. If the geartooth sensor is assembled with a relatively small gap G, signal S1 will result in a determination of a peak value P1. Since the base value B is not dependent on the installation of the geartooth sensor, it is constant as a result of an initial calibration procedure during the manufacture of the sensor. Therefore, the reference value R1 is determined for signal S1 as a function of the maximum magnitude, or peak value P1, and the base value B. However, if the same geartooth sensor is assembled in conjunction with the same gear 12, but with a larger gap G, wave form S2 could result. If this occurs, the peak magnitude P2 would be used in conjunction with the base value B to determine the reference value R2.

With continued reference to FIG. 4, the vertical dashed lines 41, 42, 47 and 48 represent the points at which the waveforms, S1 and S2, intersect the reference values, R1 and R2. Since the gap G is not easily predictable for all applications of a given geartooth sensor 10, it would be significantly beneficial if the locations of the intercept points between the reference value and the signal were identical for signals S1 and S2 and reference values R1 and R2, with respect to the rotational position of the gear, regardless of the gap G. The hypothetical representation shown in FIG. 4 shows the vertical lines are generally coincident for both waveforms, S1 and S2. However, it should be understood that this coincidence of rotational positions where the waveforms intersect the reference values is not easily attained. The primary purpose of the present invention is to provide a means for calculating the reference values as a function of the peak magnitudes and base values in a manner which assures that the intercepts between the reference value and the signal is constant, with respect to the rotational position, regardless of the gap achieved during assembly of the geartooth sensor 10 with respect to the gear 12. If this is possible, the reference value could be calculated dynamically by the geartooth sensor and the calculated reference value would always provide the geartooth sensor with sufficient ability to accurately determine the passage of teeth through the detection zone of the geartooth sensor with a consistency that is not dependent on the gap G.

Figure 5:
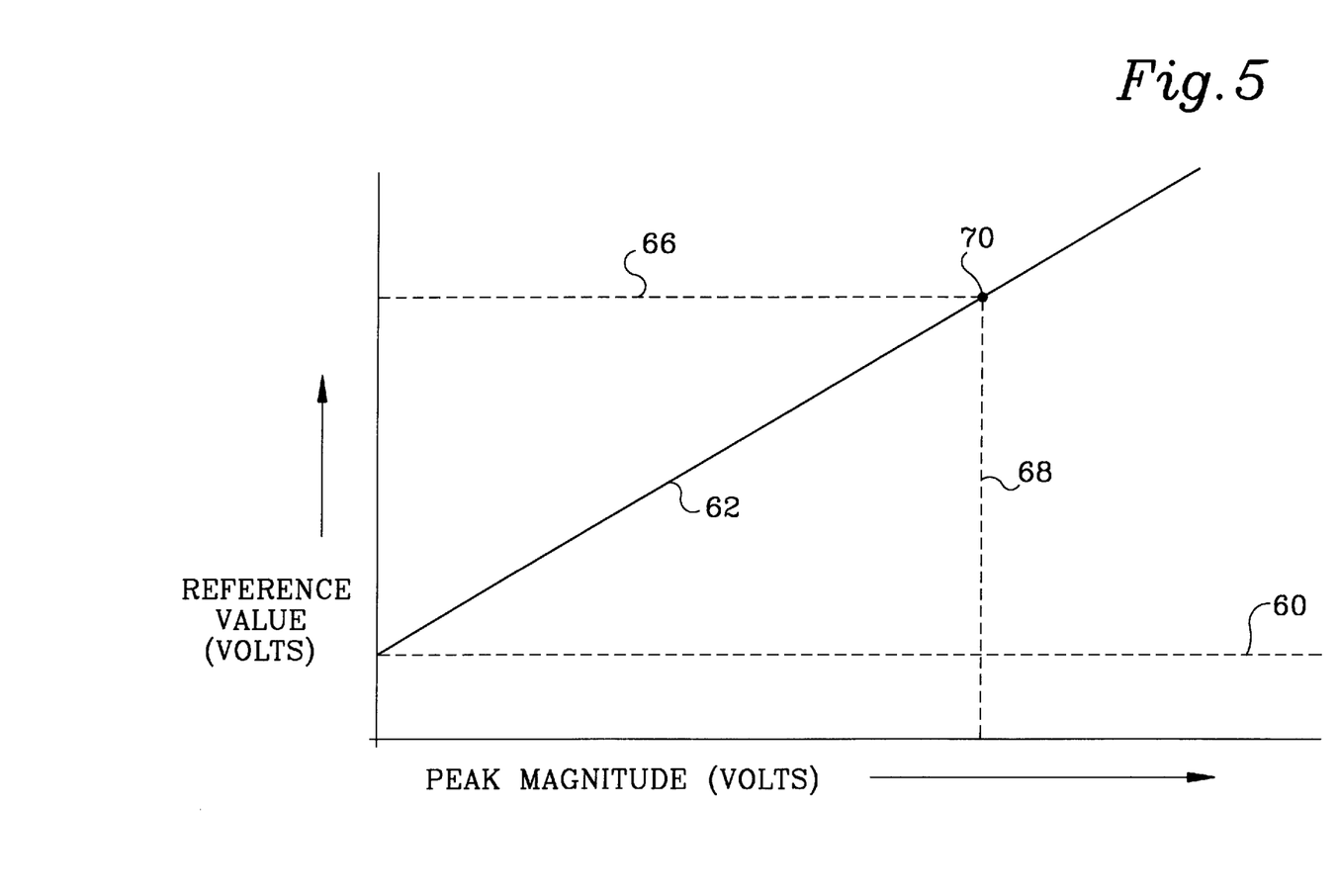
FIG. 5 shows a graphical relationship between a peak magnitude of a signal and the reference value calculated therefrom.

FIG. 5 illustrates one step in reaching this goal. In FIG. 5, the horizontal axis represents the peak magnitude P of the various tooth signals (e.g. S1 and S2) provided by the magnetically sensitive component 28. The vertical axis in FIG. 5 represents the calculated reference value that is used to determine the position of the teeth and their interstitial gaps. An offset value 60 and a slope define the line 62. This line, in turn, defines the relationship of the reference value to the peak magnitude. If this line 62 can be determined, the specific reference value 66 can be determined for any specific peak magnitude 68 by a simple mathematical procedure that is, essentially, determined by point 70 on line 62. In other words, a linear calculation such as that described above and illustrated by the arrow in FIG. 3 that defines the mathematical relationship between the reference value R, the slope X, the peak magnitude P and the base value B can be used to calculate the reference value R that will result in intercepts between the reference value and the varying signal which are consistent in identifying certain rotational positions regardless of the magnitude of gap G as shown in FIG. 1.

Figure 6:
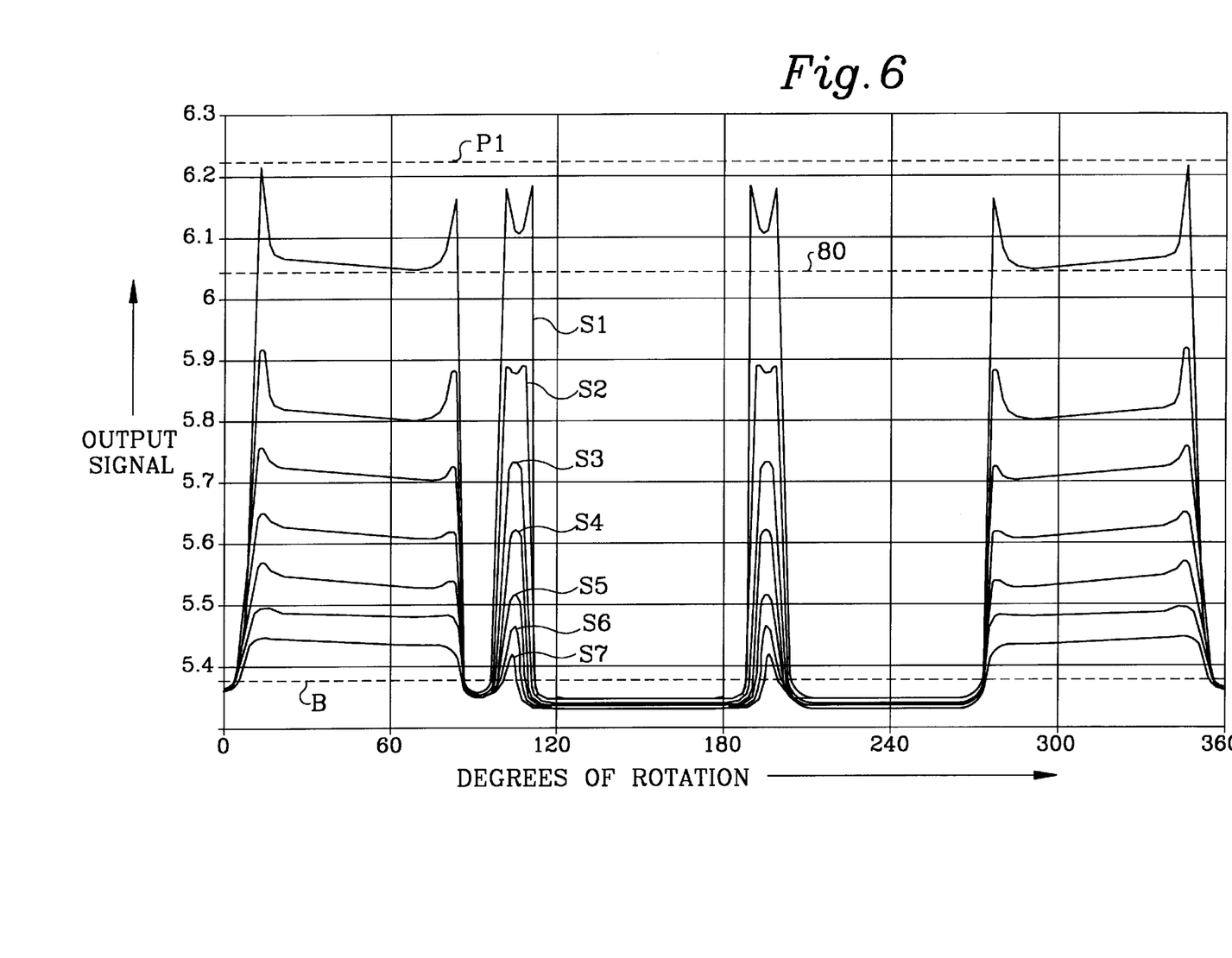
FIG. 6 shows a plurality of waveforms from a geartooth sensor simulated at various gap distances.

FIG. 6 represents a plurality of simulated curves representing the output signal from a magnetically sensitive component 28 as a gear is rotated to sequentially dispose its teeth with the detection zone of a sensor 10. As described above, the waveforms in FIGS. 3 and 4 are exemplary in nature and highly simplified to describe certain basic concepts relating to the present invention. The waveforms in FIG. 6, on the other hand, are the result of actual simulations and, as a result, illustrate certain additional problems that must be addressed if a geartooth sensor is to be provided which can accurately achieve the goals described above. In FIG. 6, seven waveforms are shown. Each of these waveforms relates to the same geartooth sensor and the same gear, but with different magnitudes of gap G.

In FIG. 6, the horizontal axis 6 represents the degrees of rotation of the gear 12 and the vertical axis illustrates the output signal magnitude provided by the magnetically sensitive component 28 and measured in volts. Signal S1 resulted from the smallest magnitude of gap G and signal S7 resulted from the largest magnitude of gap G during a series of tests of the geartooth sensor. With reference to the leftmost portion of FIG. 6, between 0 degrees and 90 degrees of rotation, it can be seen that the top portion of each of the waveforms is significantly more complex than the simplified representations shown in FIGS. 3 and 4. Two localized peaks occur in the top region of the waveform and a dip portion is located between those peaks. This phenomenon is caused by the effect on the magnetic field caused by the hard edges of the teeth. The representation in FIG. 6 was provided by using a gear with four teeth. Wide teeth are located between 0 degrees and 90 degrees and between 270 degrees and 360 degrees, approximately. Narrow teeth are located at approximately 100 degrees and at approximately 200 degrees. A narrow gap is located at approximately 90 degrees and at 0 degrees. A wider gap is located between 120 degrees and 180 degrees and also between 210 degrees and 270 degrees.

With continued reference to FIG. 6, dashed line P1 represents the peak magnitude for waveform S1 and dashed line B represents a base value that is determined during calibration of the sensor. Although base value B is approximately equal to the voltage magnitude of the bottom peaks of all of the curves, it should be clearly understood that this is not required in all embodiments of the present invention. As will be described below, various magnitudes of the base value B can be used within the scope of the present invention as long as the base value is constant for any particular sensor. Certain advantages can be achieved by selecting a base value B which is generally equal to the minimum values of the curves, but this is not necessary.

With continued reference to FIG. 6, certain characteristics can be observed with regard to the waveforms. First, most of the waveforms exhibit a dip between the peaks that are localized at each hard edge of the teeth. For example, dashed line 80 represents the minimum value of the dip for signal S1. Similar lines could be used to identify the dip portion of the other signals, but these are omitted for purposes of clarity. Any reference value that is selected as a function of the peak magnitude P1 must avoid certain disadvantages that could lead to disastrous consequences during the operation of the sensor. The reference value is intended to be used in comparison with the signal in order to determine the presence of the teeth as they pass through the detection zone. If the reference value is improperly selected, the complex shape of the waveforms in FIG. 6 could deceive the sensor into determining a presence or absence of a tooth which is incorrect. In other words, if the reference value is selected to be a magnitude between dashed line 80 and dashed line P1 in FIG. 6, a comparison of the reference value to the actual signal S1 would cause several false indications of teeth as signal S1 intersects this hypothetical reference value at the locations where the local peaks occur because of the hard edges of the teeth. More specifically, if a reference value of 6.1 volts is improperly selected, signal S1 would cross the reference in a rising direction at approximately 10 degrees and again cross the reference value in a descending direction a few degrees later. It would again cross the reference value of 6.1 at approximately 70 degrees in a rising direction and immediately cross it again a few degrees later in a descending direction. Obviously, the selection of a reference value of 6.1 volts in conjunction with signal S1 would provide useless information. In other words, the dip portion of the waveforms must be avoided when the reference value is selected. It should also be remembered that the primary goal of the present invention is to provide a reference value that yields intercepts between it and the signal which identify the passage of a tooth with the same, or similar, accuracy regardless of the magnitude of gap G. In other words, the selected reference values for the seven waveforms shown in FIG. 6 should all result in the same vertical dashed lines connecting the intercepts between these chosen reference values and the waveforms from which they were chosen.

Figure 7:
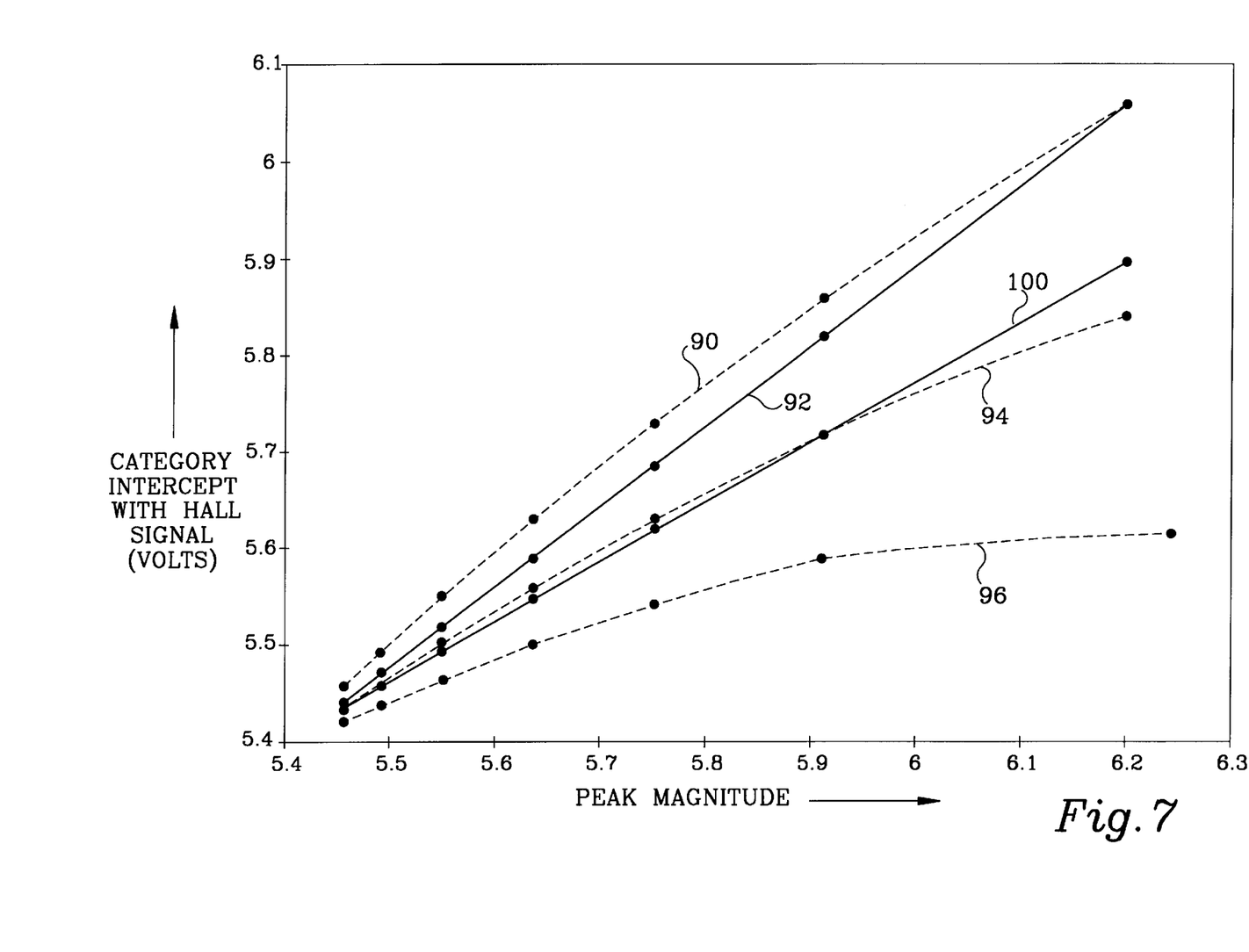
FIG. 7 shows numerous relationships between characteristics of a geartooth sensor and a peak magnitude of its signal.

FIG. 7 illustrates a graphical representation showing a number of characteristics plotted on a horizontal axis which represents the peak magnitude P and a vertical axis which represents the magnitude on the waveform where that category of characteristic intercepts the signal provided by the magnetically sensitive component 28. The results shown in FIG. 7 are the results of actual simulations. They coincide with the graphical representations of FIG. 6.

With reference to FIGS. 6 and 7, it should be understood that each of the waveforms, S1–S7, in FIG. 6 have a single peak value and a single dip value. For example, signal S1 has a peak value of P1 and a dip value represented by dashed line 80. The peak value is defined as being the highest peak of the numerous peaks occurring with respect to signal S1 and the dip value is the lowest dip value of the several associated with signal S1. The lowest dip value is identified by dashed line 80 in FIG. 6. For each of the waveforms in FIG. 6, the dip values are plotted as a function of their respective peak values in FIG. 7. These seven distinct points are connected by dashed line 90. The voltage signal occurring at the actual hard edges of the teeth are represented by the points connected by line 92 in FIG. 7. For purposes of studying the characteristics of these waveforms, a plus and minus one degree position from the hard edges was empirically determined and the intercepts between these vertical lines representing the plus and minus one degree variation from the hard edges was compared to the signals shown in FIG. 6. These points are connected by dashed line 94 in FIG. 7. This same procedure was performed with regard to a plus and minus two degree variation and these points are connected by dashed line 96.

With continued reference to FIGS. 6 and 7, it should be understood that most applications of geartooth sensors associated with automobile engines require a plus or minus two degree tolerance band for the geartooth sensor to be acceptable. This is represented by dashed line 96 in FIG. 7.

In FIG. 7, certain characteristics are represented and certain assumptions can be made based on their relative magnitudes. First, it can be seen that the dip magnitudes 90 and the hard edges 92 of the teeth intersect at a peak magnitude of approximately 6.2 volts for a zero gap dimension. As explained above, the use of a reference value approximately equal to the dip magnitude would not be appropriate because of this intersection. On the other hand, dashed line 96 exhibits a significantly nonlinear characteristic which makes it very difficult to provide a linear representation of the plus and minus two degree points. Dashed line 94, on the other hand, is much more linear than dashed line 96 and, more importantly, is safely spaced apart from the dip magnitudes represented by dashed line 90. It is also within the plus and minus 2 degree tolerance band that is generally used in conjunction with many geartooth applications. Therefore, straight line 100 can be used for the purpose of calculating reference values for use in comparing the signal magnitudes to the reference value to determine the presence and absence of teeth in the detection zone. Line 100 is advantageous for several purposes. It is a linear relationship which facilitates its application using electronic circuitry techniques. In addition, it is virtually identical to the one degree variation line 94 in FIG. 7 between peak magnitudes of 5.45 volts and 5.9 volts when the gap is in the range of 0.5 millimeter to 3 millimeters. Beyond 5.9 volts, it is actually closer to the hard edge 92 of the teeth than the one degree line 94. Therefore, it represents a reasonably accurate technique for determining the reference value as a function of the peak magnitude. The slope X and base value B can be determined from the slope and intercept of line 100 which is the best fit of dashed line 96.

Figure 8:
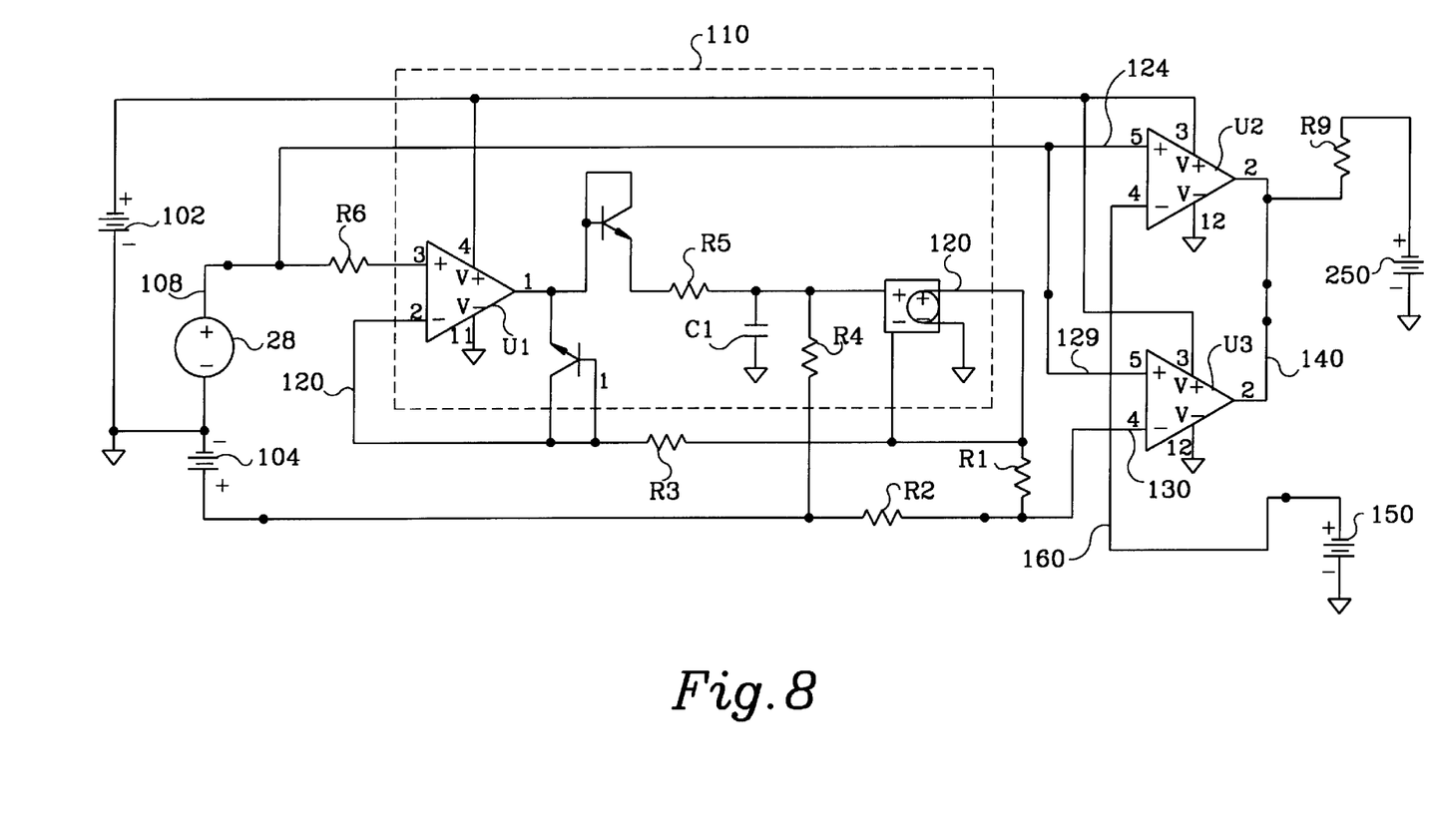
FIG. 8 shows a circuit that can be used to perform the method of the present invention.

FIG. 8 illustrates a circuit that can be used to implement the concepts of the present invention in a geartooth sensor. A magnetically sensitive component 28, such as a Hall effect element, is provided with power from a DC voltage source 102. A reference voltage is provided by DC voltage source 104. This DC voltage source 104 is used to provide the equivalent of base value B as described above in conjunction with FIG. 6 and several earlier Figures. The signal S from the magnetically sensitive component 28 is provided on line 108. Dashed box 110 represents the peak detection and hold circuitry of the present invention. It employs techniques generally known to those skilled in the art and will not be described in significant detail herein. Capacitor C1 is used to hold the peak value for a preselected period of time determined by the time constant of the circuit. The components in dashed box 110 are specifically chosen to permit the capacitor C1 to discharge at a slow and controlled rate over time. This controlled discharge is provided so that the voltage across capacitor C1 does not progressively increase and, as a result, create erroneously high peak values. As sequential teeth of a gear pass through the detection zone, the magnitude of the signal S on line 10 is continually compared, by comparator U1, to the most current peak magnitude on line 120. This same signal S is provided on line 124 to comparator U2. Resistors R1 and R2 are selected to divide the peak magnitude on line 120 by a preselected ratio and provide that reference value on line 130 to comparator U3. Comparator U3 compares the signal S on line 128 with the reference value R on line 130 and provides an output signal on line 140 which is binary in nature and represents the relative magnitudes of the signal S and the reference value R. Resistors R1 and R2, as described above, are selected to provide the slope X of the relationship between the reference value and the peak value. In one embodiment of the present invention, the most optimum ratio is 63 percent. Therefore, resistor R1 is selected to be 3.7K ohms and resistor R2 is selected to be 6.3K ohms. It should be understood that alternative applications of the present invention could result in different optimal slopes if the resulting line 100 for that application has a different slope. DC voltage source 104 is selected to provide a representation of the base value B.

With continued reference to FIG. 8, a voltage source 150 provides a voltage magnitude on line 160 to comparator U2 in order to provide for a situation in which an appropriate reference value R has not yet been properly determined. This occurs during the start-up of an engine when an initial partial rotation of the gear has not yet provided sufficient signal information to the peak detector and hold circuit 110 for it to properly calculate a reference value on line 130 to comparator U3. During this short interval of time before an appropriate reference value has been selected, the DC voltage source 150 provides an artificial magnitude on line 160 to suffice as a reference value until a true reference value can be determined.

In Table I, the values of the components shown in FIG. 8 are identified for one embodiment of the present invention. However, it should be understood that these specific values are not limiting to the present invention but, instead, represent one particular embodiment used to provide the graphical information described above. The DC voltage provided by source 104 and the slope determined by resistors R1 and R2 coincide with the slope and intercept of line 100 in FIG. 7. The reference value determined as a function of this slope and offset will provide a reference that is within approximately 1 degree of rotation of the actual hard edges of the teeth and will also avoid the dip 90 described above in conjunction with FIG. 7. It is linear and can be easily implemented with circuit design processes as described above in conjunction with FIG. 8.

TABLE I

| Component | Magnitude or Type |
| --- | --- |
| R1 | 3.7K ohms |
| R2 | 6.3K ohms |
| R3 | 10K ohms |
| R4 | 10meg ohms |
| R5 | 3K ohms |
| R6 | 10K ohms |
| R9 | 5K ohms |
| C1 | 1 microfarad |
| 102 | 4 to 100 VDC |
| 104 | 1.370 volts DC |
| 150 | 1.42 volts DC |
| 250 | 4 to 30 VDC |
| U1 | OP.AHP |
| U2 | comparator |
| U3 | comparator |

Figure 9:
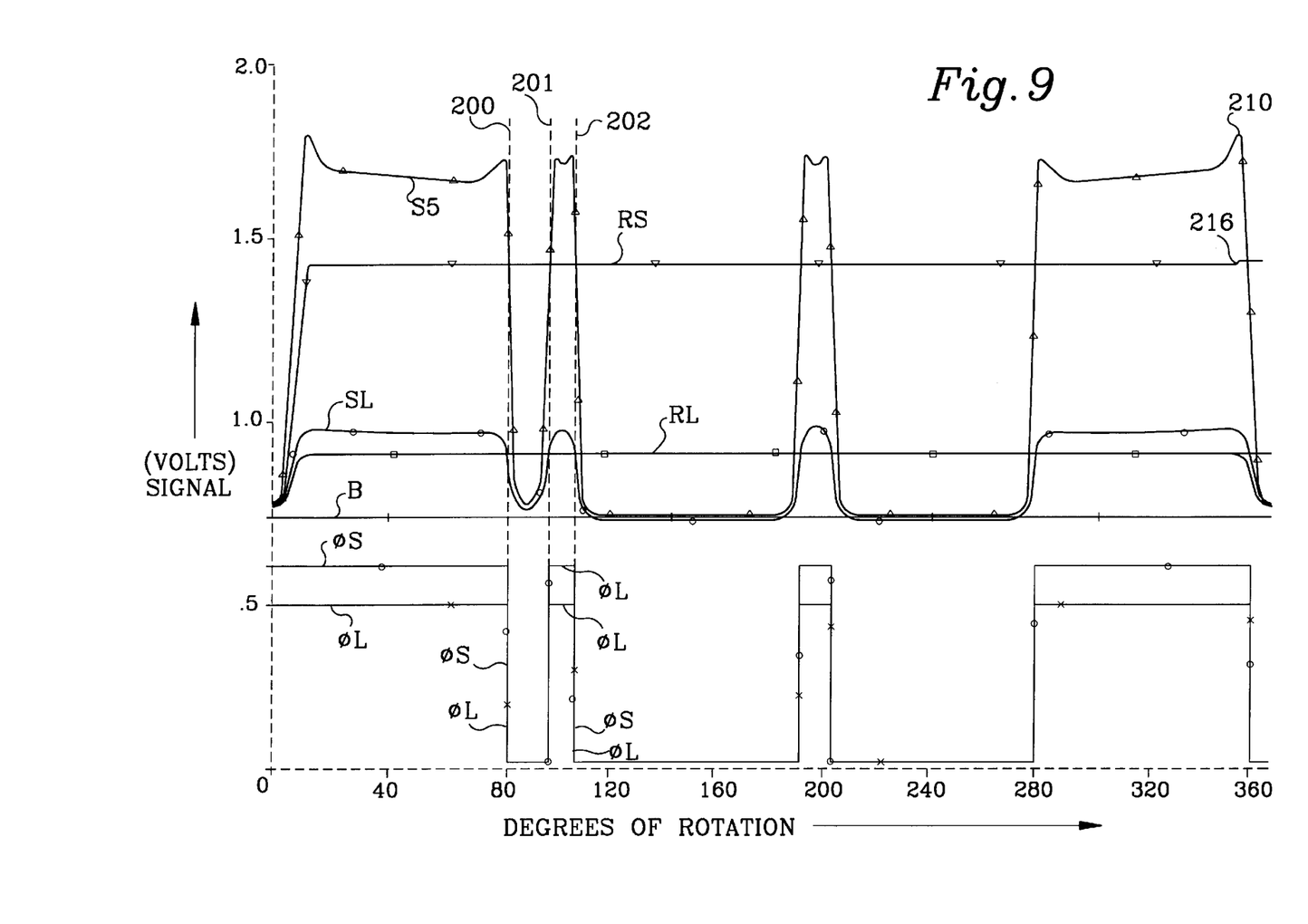
FIG. 9 shows certain results that are achievable through the use of the present invention.

FIG. 9 shows an example of the results that can be achieved through the use of the present invention. Two waveforms are illustrated, in FIG. 9, which represent the actual results of a simulation for a geartooth sensor 10 disposed at two significantly different gaps G with respect to the gear 12. In the upper portion of the graphical representation in FIG. 9, the waveform SS represents the output signal from the magnetically sensitive component 28 when the gap G is very small. In this example, the gap G is approximately 0.5 millimeters. Waveform SL represents the output from the magnetically sensitive component 28 when the gap is much larger. The gap G that resulted in waveform SL is approximately 2.5 millimeters. In the lower portion of FIG. 9, two output signals are represented by lines OS and OL. Signal OS represents the output signal from the present invention when the small gap of 0.5 millimeters is used and signal OL represents the output signal from the present invention when the large gap of 2.5 millimeters was used. As can be seen in FIG. 9, the rising edges and falling edges of signals OL and OS are essentially coincident with each other even though the maximum magnitude of signals OL and OS are shown as being separated for clarity.

The coincident rising and falling edges of signals OS and OL results from the fact that the reference value RS determined as a function of signal SS intersects signal SS at precisely the same degree of rotation that reference value RL intersects signal SL. This is illustrated by dashed lines 200, 201 and 202 which are provided to show these rotational alignments. When a small gap G exists between the sensing face of the sensor 10 and the gear 12, waveform SS is provided as an output from the magnetically sensitive component 28 described above in conjunction with FIG. 1. Reference value RS is calculated as a function of the peak value of signal SS and a base value that is predetermined by calibration during the manufacture of the sensor. Using the relationships described above in conjunction with FIG. 7, the circuit described above in conjunction with FIG. 8 determines the reference value RS. When signal SS is greater than reference RS, associated circuitry of the sensor provides an output signal, on line 140 of FIG. 8, that is logically high. This signal is signal OS. Alternatively, when signal SS is less than the reference value RS, a logically low signal is provided. Both of these logic levels are represented in FIG. 9 in output signal OS. When the sensing face of the sensor 10 is disposed a larger distance from the gear, the magnitudes of the signal from the magnetically sensitive component are significantly decreased in this simulation. The resulting signal SL is used to determine the reference value RL. Comparison of these two signals, by comparator U3 in FIG. 8, yields the binary signal OL shown at the bottom portion of FIG. 9. By using the techniques described above in conjunction with FIG. 7, the straight line 100 in FIG. 7 allows the reference value, either RS or RL in the above example, to be calculated by adding a base value B to a fixed percentage of the difference between the peak magnitude of the signal and the base value. This is accomplished by the provision of a constant DC voltage and the addition of a scaled portion of the difference between the peak value and the base value by the circuitry illustrated in FIG. 8. The equivalent voltage that represents the base value is provided by the DC voltage source 104 and the preselected percentage is achieved by using the scaling factor provided by resistors R1 and R2. This reference value is then provided on line 130 to comparator U3 which compares it to the varying signal, SS or SL, which is on line 128 in FIG. 8.

FIG. 9 illustrates the consistency of results that are achievable through the use of the present invention. Dashed lines 200, 201 and 202 illustrate the remarkable consistency of the signals even when the gap G varies significantly. In FIG. 9, several other characteristics can be seen. First, reference values RS and RL begin at the base value magnitude B and rapidly increase as their respective signals, SS or SL, increase. During start up, the peak magnitude of the signal continues to increase during the first 10 degrees of rotation. Because of the manner in which the reference value is determined, the reference value will continue to increase as a function of the increasing peak magnitude. At approximately 10 degrees of rotation, the reference values, RS or RL, stabilize.

With reference to signal SS, it can be seen that the peak that occurs at approximately 10 degrees is the highest peak of the signal SS until approximately 350 degrees. Then, a new peak 210 is sensed. The slight increase in the reference value RS can be seen in FIG. 9 and is identified by reference numeral 216. It should be understood that during the second revolution of the gear the slightly increased reference value RS, which was increased at point 216, would be used by the circuit in FIG. 8.

As can be seen in FIG. 9, the present invention provides a means for determining a reference value in such a way that the output signals from the geartooth sensor are consistent over a wide range of gap dimensions G. This consistency represents a significant advantage over existing geartooth sensors.

Although the present invention has been described with considerable detail and illustrated with particular specificity, it should be understood that alternative embodiments are also within its scope.

The embodiments of the invention in which an exclusive property or right is claimed are defined as follows:

1. A method for sensing the position of a ferromagnetic object, comprising:

providing a magnetic field having an effective range which extends through a preselected detection zone, said magnetic field being affected by movement of said ferromagnetic object relative to said detection zone;

disposing a magnetically sensitive component within said magnetic field, said magnetically sensitive component providing a first signal which is responsive to a portion of said magnetic field imposed on said magnetically sensitive component;

determining a base value;

measuring a maximum magnitude of said first signal during a preselected period of time;

determining a reference value as a function of said base value and said maximum magnitude by adding said base value to a preselected percentage of the difference between said base value and said maximum magnitude;

comparing said first signal to said reference value; and providing a second signal which is a function of the relative magnitudes of said first signal and said reference value, whereby said second signal is representative of said position of said ferromagnetic object relative to said detection zone.

2. The method of claim 1, wherein:

said magnetic field is provided by a permanent magnet.

3. The method of claim 2, wherein:

said detection zone is proximate to a magnetic pole face of said permanent magnet.

4. The method of claim 2, wherein:

said magnetically sensitive component is disposed between said permanent magnet and said detection zone.

5. The method of claim 1, wherein:

said magnetically sensitive component comprises a Hall effect element.

6. The method of claim 1, wherein:

said ferromagnetic object is a tooth of a gear.

7. The method of claim 6, wherein:

said preselected period of time is equivalent to one revolution of said gear about an axis of rotation.

8. The method of claim 7, wherein:

said gear comprises a plurality of ferromagnetic teeth attached thereto, each of said teeth sequentially passing through said detection zone as said gear rotates about said axis of rotation.

9. A method for sensing the position of a ferromagnetic object, comprising:

providing a magnetic field having an effective range which extends through a preselected detection zone, said magnetic field being affected by movement of said ferromagnetic object relative to said detection zone, said magnetic field being provided by a permanent magnet;

disposing a magnetically sensitive component within said magnetic field, said magnetically sensitive component providing a first signal which is responsive to a portion of said magnetic field imposed on said magnetically sensitive component, said detection zone being proximate to a magnetic pole face of said permanent magnet, said magnetically sensitive component being disposed between said permanent magnet and said detection zone;

determining a base value;

measuring a maximum magnitude of said first signal during a preselected period of time;

determining a reference value as a function of said base value and said maximum magnitude by adding said base value to a preselected percentage of the difference between said base value and said maximum magnitude;

comparing said first signal to said reference value; and providing a second signal which is a function of the relative magnitudes of said first signal and said reference value, whereby said second signal is representative of said position of said ferromagnetic object relative to said detection zone.

10. The method of claim 9, wherein:

said magnetically sensitive component comprises a Hall effect element.

11. The method of claim 9, wherein:

said ferromagnetic object is a tooth of a gear, said preselected period of time being equivalent to one revolution of said gear about an axis of rotation.

12. The method of claim 11, wherein:

said gear comprises a plurality of ferromagnetic teeth attached thereto, each of said teeth sequentially passing through said detection zone as said gear rotates about said axis of rotation.

13. A ferromagnetic object sensor, comprising:

means for providing a magnetic field having an effective range which extends through a preselected detection zone, said magnetic field being affected by movement of said ferromagnetic object relative to said detection zone;

means for disposing a magnetically sensitive component within said magnetic field, said magnetically sensitive component providing a first signal which is responsive to a portion of said magnetic field imposed on said magnetically sensitive component;

means for determining a base value;

means for measuring a maximum magnitude of said first signal during a preselected period of time;

means for determining a reference value as a function of said base value and said maximum magnitude by adding said base value to a preselected percentage of the difference between said base value and said maximum magnitude;

means for comparing said first signal to said reference value; and means for providing a second signal which is a function of the relative magnitudes of said first signal and said reference value, whereby said second signal is representative of said position of said ferromagnetic object relative to said detection zone.

14. The sensor of claim 13, wherein:

said means for providing a magnetic field comprises a permanent magnet.

15. The sensor of claim 14, wherein:

said detection zone is proximate to a magnetic pole face of said permanent magnet.

16. The sensor of claim 15, wherein:

said magnetically sensitive component is disposed between said permanent magnet and said detection zone.

17. The sensor of claim 13, wherein:

said magnetically sensitive component comprises a Hall effect element.

18. The sensor of claim 13, wherein:

said ferromagnetic object is a tooth of a gear.

19. The sensor of claim 18, wherein:

said preselected period of time is equivalent to one revolution of said gear about an axis of rotation.

20. The sensor of claim 19, wherein:

said gear comprises a plurality of ferromagnetic teeth attached thereto, each of said teeth sequentially passing through said detection zone as said gear rotates about said axis of rotation.

* * * * *